(12) United States Patent  
Asamoto et al.

(10) Patent No.: US 8,601,488 B2
(45) Date of Patent: Dec. 3, 2013

(54) CONTROLLING THE TASK SWITCH TIMING OF A MULTITASK SYSTEM

(75) Inventors: Noriaki Asamoto, Shiga (JP); Masahiro Murakami, Kyoto (JP)

(73) Assignee: International Business Machines Corporation, Armonk, NY (US)

( * ) Notice: Subject to any disclaimer, the term of this patent is extended or adjusted under 35 U.S.C. 154(b) by 287 days.

(21) Appl. No.: 12/954,949

(22) Filed: Nov. 29, 2010

(65) Prior Publication Data

US 2011/0161982 A1 Jun. 30, 2011

(30) Foreign Application Priority Data

Dec. 25, 2009 (JP) ................................. 2009-293912

(51) Int. Cl.
*G06F 9/46* (2006.01)
(52) U.S. Cl.
USPC ........................................................ 718/108
(58) Field of Classification Search
USPC .................................................. 718/100, 108
See application file for complete search history.

(56) References Cited

U.S. PATENT DOCUMENTS

| | | | | |
|---|---|---|---|---|
| 5,274,813 A * | 12/1993 | Itoh | ............................... | 717/127 |
| 6,157,989 A * | 12/2000 | Collins et al. | .................. | 711/151 |
| 6,470,376 B1 * | 10/2002 | Tanaka et al. | .................. | 718/108 |
| 7,290,124 B2 * | 10/2007 | Sugure et al. | .................. | 712/244 |
| 7,386,853 B2 * | 6/2008 | Hanzawa | ....................... | 718/108 |
| 7,584,312 B2 * | 9/2009 | Kuroda et al. | .................. | 710/52 |
| 7,954,101 B2 * | 5/2011 | Adachi et al. | .................. | 718/102 |
| 7,979,686 B1 * | 7/2011 | Robles | ........................... | 712/244 |
| 8,214,628 B2 * | 7/2012 | Hirai et al. | ..................... | 712/244 |
| 2001/0034751 A1 * | 10/2001 | Eto et al. | ........................ | 709/100 |
| 2007/0016908 A1 * | 1/2007 | Kuroda | ........................... | 718/107 |
| 2009/0183163 A1 * | 7/2009 | Maruyama | .................... | 718/103 |
| 2009/0204841 A1 * | 8/2009 | Niwa et al. | ..................... | 713/400 |
| 2009/0235056 A1 * | 9/2009 | Hirai et al. | ..................... | 712/220 |
| 2010/0262976 A1 * | 10/2010 | Maruyama | .................... | 718/108 |

FOREIGN PATENT DOCUMENTS

| | | |
|---|---|---|
| JP | 05088918 A | 4/1993 |
| JP | 2001249808 | 9/2001 |
| JP | 2003131892 | 5/2003 |
| JP | 2007219937 | 8/2007 |

* cited by examiner

*Primary Examiner* — Van Nguyen
(74) *Attorney, Agent, or Firm* — L. Jeffrey Kelly; H. Daniel Schnurmann

(57) ABSTRACT

Ensuring real-time performance of multitask control and improving the processing efficiency of a system provided with a processor processing while switching between a plurality of tasks. The system includes an execution unit executing instructions on individual tasks while switching from one task to another, a distinguishing unit executing an instruction determined to be a predetermined instruction. The system further includes a determination unit set so that on condition that the instruction to be executed is the predetermined instruction, it determines whether to allow the execution unit to execute the predetermined instruction or to perform a task switching process without executing the predetermined instruction based on a predetermined condition.

8 Claims, 12 Drawing Sheets

FIG. 5

```
      ⋮ lis    r3, 0x0000 ori    r3, r3, 0x0100 lwz    r4, 0(r3)

lis    r3, 0xF000 ori    r3, r3, 0x0400 lwzd   r5, 0(r3)

⋮
```

CONTROLLING THE TASK SWITCH TIMING OF A MULTITASK SYSTEM

FIELD OF THE INVENTION

The present invention relates to task control in a multitask system, and more particularly, to control task processing times, ensuring a real-time performance of the multitask control.

BACKGROUND ART

Computer-process execution environments are multitask environments in which a plurality of processes is executed in parallel. In the multitask environment, a task switching process (task switch) wherein tasks to be executed are switched based on predetermined conditions performed by, for instance, an operating system (OS) by which the individual tasks are executed in sequence. In general, the task switching process is performed by executing an interrupt process involving a series of operations for switching tasks while the one is already running.

In the multitask environment, if a task is processed by a real-time process, the process needs to be guaranteed to be completed within a predetermined time. Processing time for a CPU instruction generally spans over several nanoseconds for logical operations, while for I/O instructions, it lasts typically several microseconds. Furthermore, if an I/O instruction is re-executed, the process is temporarily cancelled by the task switch, the state of a device and the like to be accessed changes before execution, causing problems. Accordingly, I/O instructions that are initiated to process a task cannot be interrupted.

Therefore, for a multitask control accompanying real-time processing, it is necessary to set the switching time and the longest processing time in order not to exceed the longest processing time (hereinafter referred to as the longest processing time) allocated for executing each task. This will ensure a real-time performance even if an I/O instruction that requires a long processing time executed immediately before the time allocated to the task (hereinafter referred to as a switching time) runs out.

In a multitask control accompanying real-time processing, the switching time and the longest processing time are set so as not to exceed the longest processing time even if an I/O instruction executed immediately before the switching time runs out. However, decreasing the task switching time increases the proportion of the time for spare the longest processing time (hereinafter referred to as the float). This increases the number of times of task switches, resulting in a decrease in the processing efficiency of the entire system. However, it can be difficult to estimate the longest processing time necessary for obtaining sufficient float, making it impossible to set the longest processing time and the switching time.

SUMMARY

Accordingly, in one aspect, the present invention ensures a real-time performance of multitask control, improving the processing efficiency of the system.

In one embodiment, the present invention provides a processor that executes processes while switching between a plurality of tasks. The system includes an execution unit for executing instructions on individual tasks while switching from one task to another. A distinguishing unit identifies whether an instruction to be executed is a predetermined instruction. A determination unit determines whether a condition that the instruction to be executed is the predetermined instruction is met, and if so, it determines whether to allow the execution unit to execute the instruction or to perform a task switching without executing the predetermined instruction based on that given condition.

The determination unit compares the remaining time of a processing time allocated to a running task and a preset threshold value, and on condition that the remaining time is shorter than a threshold value, it allows the execution unit to execute the task switching without processing the predetermined instruction.

In another aspect, instructions singled out by the distinguishing unit and the determination unit decides whether to execute the instruction by the determination unit to be performed in the process steps of instruction pipelines for the individual instructions. Preferably, the execution unit includes an interrupt handler to execute the task switching process based on the determination of the determination unit. The determination unit also invokes an interrupt handler and allows the execution unit to execute the task switching process.

Furthermore, the system of the present invention may include a general-purpose CPU and a dedicated processor for executing the predetermined instruction that are provided separately; and the functions of the distinguishing unit, the determination unit, and the execution unit may be implemented by way of the dedicated processor. Alternatively, the distinguishing unit may monitor reading an instruction from a memory by a processor that implements the function of the execution unit using a bus monitoring circuit. It also distinguishes whether the instruction is the predetermined instruction based on the description of the instruction, a memory address that the processor has accessed, or both.

In still another aspect, the system executes processes while switching between a plurality of tasks. The system includes a general-purpose CPU and a dedicated processor for executing a predetermined instruction. The dedicated processor includes a distinguishing unit that determines whether an instruction to be executed is the predetermined instruction. The determination unit is set on condition that the instruction to be executed is indeed the predetermined instruction. It then compares the remaining time of a processing time allocated to a running task at a preset threshold value on condition that the remaining time is shorter than the threshold value. The determination unit executes the predetermined instruction or the task switching process without executing the instruction. The task-switch processing unit configured on condition that it is determined by the determination unit to execute the task switching process, and to generate an interrupt to execute the task switching process.

Furthermore, an embodiment of the present invention includes a method in which a processor executes processes while switching between a plurality of tasks. The method includes: distinguishing whether an instruction to be executed is a predetermined instruction; it then determines, on condition that the instruction to be executed is the predetermined instruction whether to execute the predetermined instruction or to execute a task switching process without executing the instruction based on a given condition. Then, it executes a task switching process by interrupts based on outcome of the determination step in which on condition that it is determined to execute the task switching process to execute the instructions on the individual tasks while switching between the task by timer interrupts.

BRIEF DESCRIPTION OF THE DRAWINGS

FIG. 5 is a diagram showing an example of an instruction sequence for reading from a memory and readings from I/O devices.

DETAILED DESCRIPTION

Embodiments of the present invention will be described in detail below with reference to the accompanying drawings.

Figure 1:
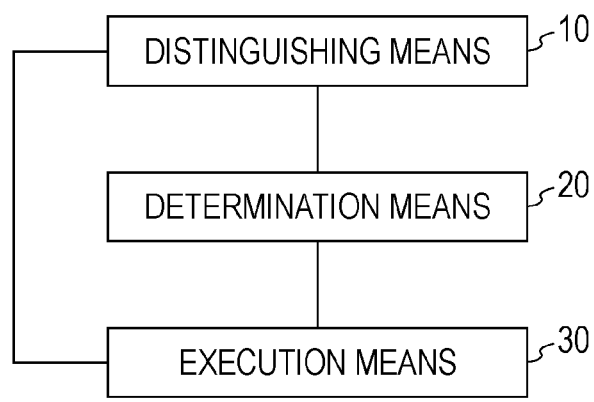
FIG. 1 is a diagram showing the basic configuration a first embodiment of the invention.

Referring to FIG. 1 is shown a diagram showing the basic configuration. A task switching system includes a distinguishing unit 10 that determines whether an instruction executed by the CPU is performed according to a given instruction. Determination unit 20 decides whether to immediately execute or hold the instruction identified by distinguishing unit 10. Execution unit 30 executing the instruction by multitask control in accordance with the determination outcome of the determination unit 20.

The distinguishing unit 10 includes a concrete unit for distinguishing an instruction, unit for introducing an instruction to be distinguished to an instruction group (instruction set) to be executed by the CPU, and a unit for analyzing the instruction to be executed by the CPU using special additional hardware, all of which will described in more detail hereinafter.

Determination unit 20 determines when an instruction to be executed by the CPU is the predetermined instruction, whether to immediately execute or hold the instruction. More particularly, a threshold value is set in advance based on a processing time required to execute the predetermined instruction, and the determination unit 20 checks, when the CPU attempts to execute the instruction, whether the remaining time until the longest processing time for the task is less than a threshold value has been reached. If the determination unit 20 finds that the remaining time is less than the threshold value, the execution unit 30 holds execution of the instruction.

Execution unit 30 includes a CPU. It executes instructions while performing a task switching process under multitask control. The instruction that is determined by the distinguishing unit 10 to be an instruction other than the predetermined instruction and, between instructions determined by the distinguishing unit 10 to be predetermined instructions, an instruction that is determined by the determination unit 20 to be an instruction to be immediately executed distinguishing unit 10. Furthermore, the execution unit 30 performs a task switching process without executing, between instructions that are determined by the distinguishing unit 10 to be predetermined instruction, an instruction that is determined by the determination unit 20 to be held, and executes the held instruction when the time to execute the task comes.

With the above configuration, when the CPU attempts to execute a predetermined instruction, if the remaining time of the longest processing time allocated to the running task is shorter than the processing time required to execute the instruction, the execution of the instruction is held up. This can prevent the time required to process a task from exceeding the longest processing time, thus allowing accurate control of task switch timing.

Next, concrete examples of an embodiment will be described. Herein, an instruction to be distinguished is applied as the distinguishing unit 10 and a unit is provided for analyzing the instruction.

A system according to a first embodiment implements the distinguishing unit 10 and the determination unit 20 as functions of the CPU. As a method for implementing the distinguishing unit 10, a predetermined instruction is introduced to an instruction set to be executed by the CPU. The predetermined instruction introduced is sometimes put on hold in accordance with the result of determination by the determination unit 20 and is referred to as a postponable instruction (hereinafter referred to as a P-instruction). In the first embodiment, the CPU distinguishes whether an instruction to be executed is a P-instruction when executing the instruction.

The P-instruction is set, as appropriate as a CPU instruction included in an instruction set executable by the CPU depending on the operating environment, and use of the system. In particular, for CPU instructions that take an uncertain processing time, probably sufficiently long, such as a load/store instruction and a sync instruction for synchronizing a series of instructions that are processed in parallel, it is preferably to set P-instructions in view of preventing the processing times from exceeding the longest processing time allocated to the tasks by executing the instructions.

Figure 2:
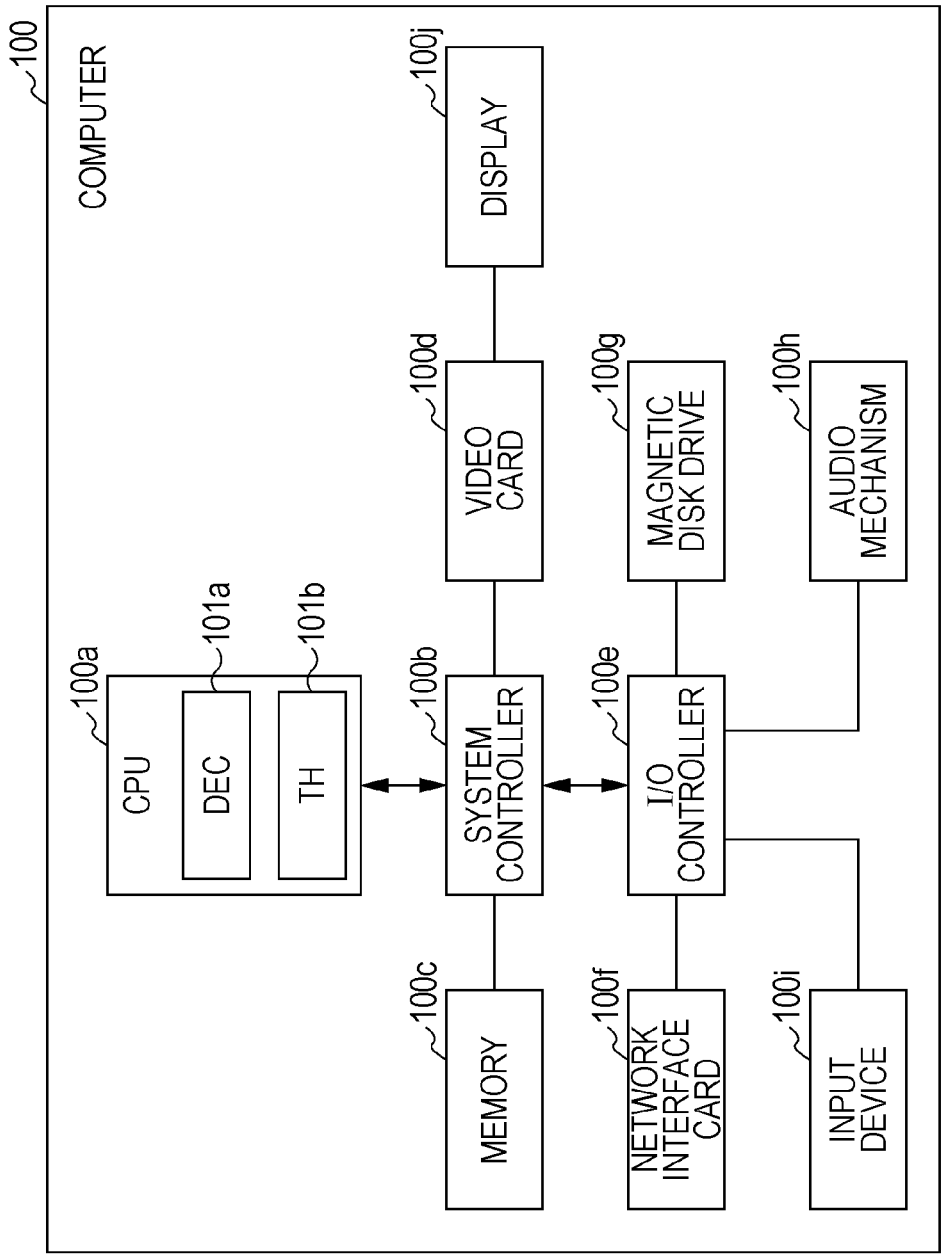
FIG. 2 is a diagram showing an illustrative hardware configuration of a computer to which a task switch system of the first embodiment is applied.

FIG. 2 is a diagram showing a hardware configuration example of a computer to which the task switch system of the first embodiment is applied.

A computer 100 shown in FIG. 2 includes a central processing unit (CPU) 100a serving as arithmetic unit and a memory 100c serving as main storage unit. The computer 100 further includes, as external devices, a magnetic disk drive (HDD: hard disk drive) 100g, a network interface card 100f, a video card 100d, a display 100j, an audio mechanism 100h, and an input device 100i, such as a keyboard and a mouse.

In the illustrative example shown in FIG. 2, the memory 100c and the video card 100d are connected to the CPU 100a via a system controller 100b. The network interface card 100f, the magnetic disk drive 100g, the audio mechanism 100h, and the input device 100i are connected to the system controller 100b via an I/O controller 100e. Individual components are attached to one another through various buses, such as a system bus and input/output buses. Although not particularly shown, an interrupt controller is provided between the external devices and the CPU 100a. For simplicity, FIG. 2 merely shows an example of a computer hardware configuration suitable for application of the first embodiment.

Magnetic disk drive 100g stores an OS and software programs. Programs are read into the memory 100c and are executed by the CPU 100a, so that various functions including the execution unit 30 shown in FIG. 1 are achieved. P-instruction is preferably included in an instruction set that the CPU 100a can execute.

Furthermore, the CPU 100a in the first embodiment includes a decrementer register (DEC register) 101a and a threshold register (TH register) 101b. At task switch, a value (time-out value) corresponding to the longest processing time of the task is set in the DEC register 101*a* by the OS and is decremented by one every CPU clock. Accordingly, the remaining time of the task is indicated by the value of the DEC register 101*a*.

Referring to TH register 101*b*, a threshold value is set which serves as a reference for the determination unit 20 to determine whether to immediately execute the P-instruction. If the value (remaining time) of the DEC register 101*a* is greater than the threshold value of TH register 101*b*, the determination unit 20 determines to immediately execute the P-instruction (CPU instruction). In contrast, if the value of the DEC register 101*a* is smaller than the value of TH register 101*b*, the determination unit 20 determines to hold the P-instruction. Here, control such that the P-instruction is held in the case where the threshold is set at 0 and the remaining time of the task is 0 does not need TH register 101*b*. However, the provision TH register 101*b* allows different threshold values to be set depending on the kinds of P-instruction. For example, in general, there is a high probability that a store instruction is completed earlier than a load instruction. Thus, a small value can be set as a threshold value for the store instruction, and a value larger than the threshold value for the store instruction can be set as a threshold value for the load instruction. In the case where a plurality of threshold values are set, a plurality of TH registers 101*b* should be prepared.

Figure 3:
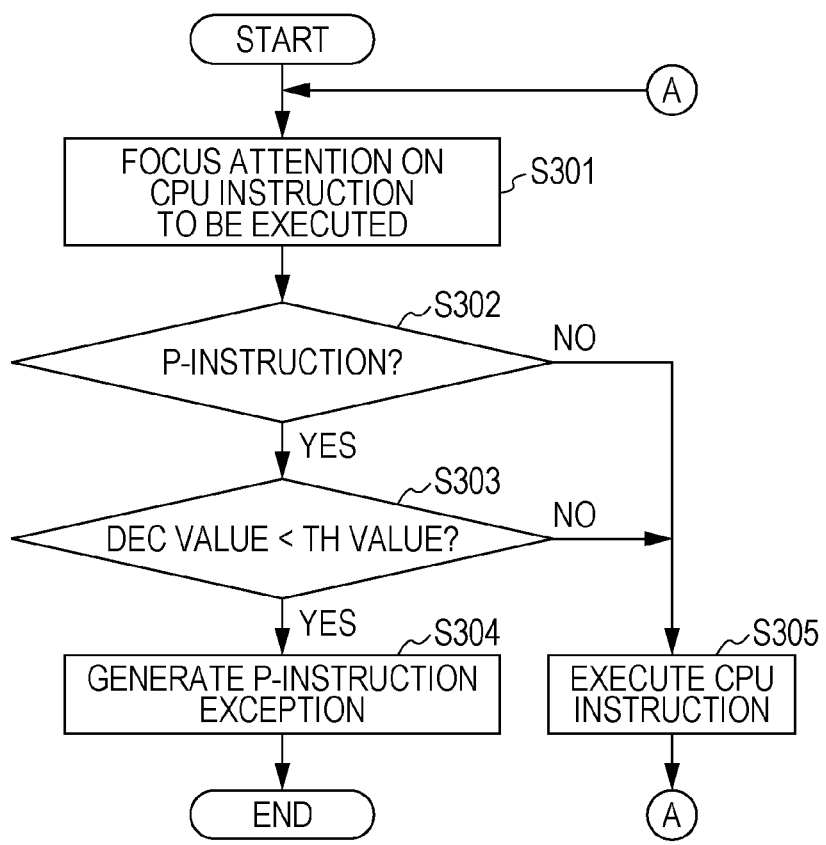
FIG. 3 is a flowchart showing a method for task control.

Referring to FIG. 3, the CPU 100*a* focuses attention on a CPU instruction to be executed (step S301) and determines whether the CPU instruction is a P-instruction using the function of the distinguishing unit 10 (step S302). If the CPU instruction is not a P-instruction, the CPU 100*a* immediately executes the CPU instruction using the function of the execution unit 30 (step S305). The CPU 100*a* returns to step S301 and focuses attention on the next CPU instruction to be executed.

If the CPU instruction to be executed is a P-instruction, then the CPU 100*a* compares the value of the DEC register 101*a* (hereinafter referred to as a DEC) and the value of TH register 101*b* (hereinafter referred to as a TH) letting the determination unit 20 determine whether to immediately execute the CPU instruction (P-instruction) (step S303). In the example of FIG. 3, if the DEC is equal to or greater than TH, the CPU 100*a* immediately executes the CPU instruction using the function of the execution unit 30 (step S305). Then, the CPU 100*a* returns to step S301 and focuses on the next CPU instruction.

If the CPU instruction to be executed is a P-instruction and if the DEC is smaller than TH, the CPU 100*a* generates an interrupt (referred to as a P-instruction exception) using the function of the determination unit 20 (step S304). Thus, like general interrupt handling (exception handling), an interrupt handler for P-instruction exception in the OS is invoked, context information is stored, and thereafter, the task to be executed is switched. When the task completed by the interrupt handler is executed next, the process is restarted from the present CPU instruction (P-instruction).

Figure 4:
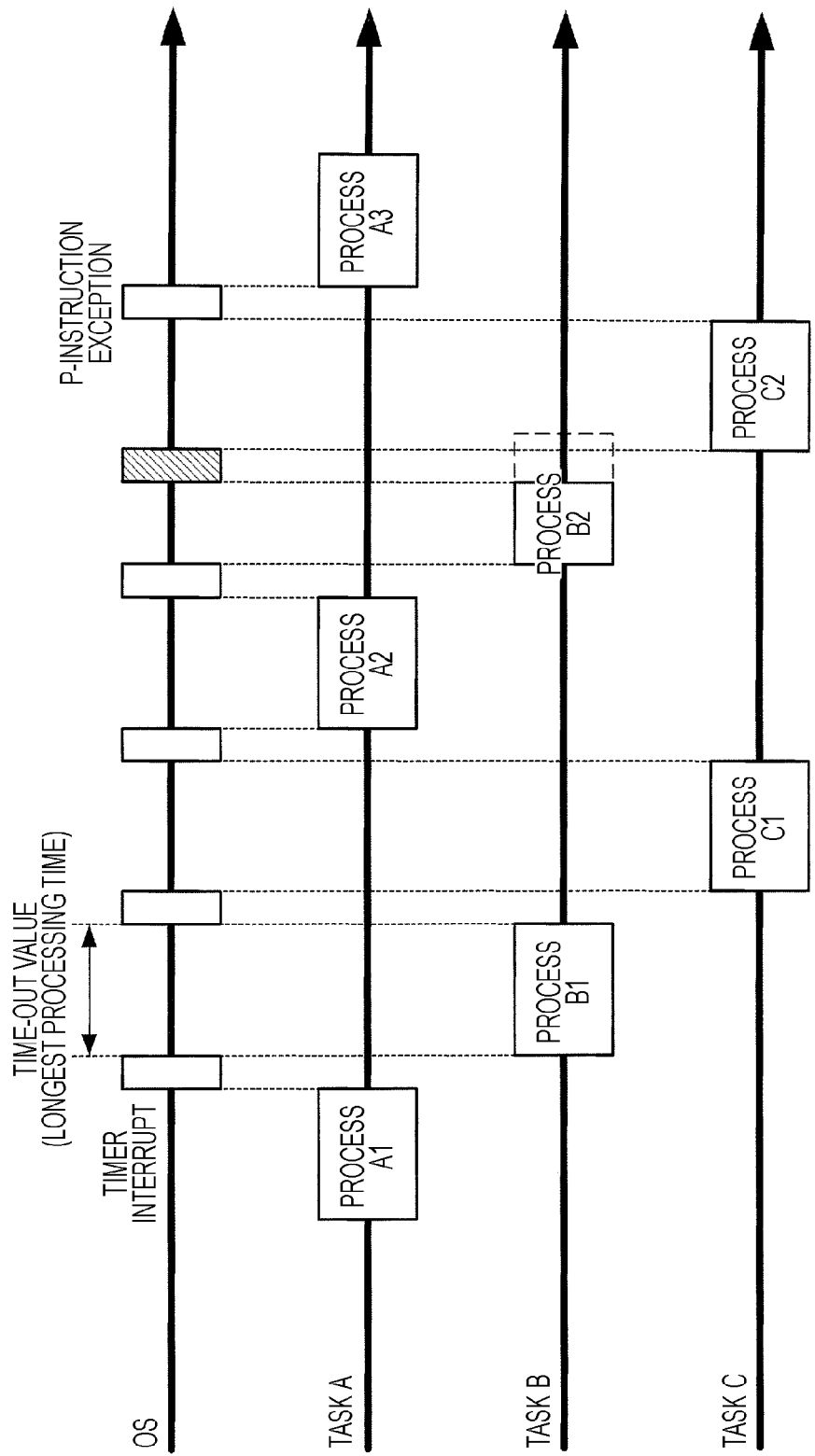
FIG. 4 is a time chart illustrating the state of the task switch.

FIG. 4 is a time chart illustrating the state of task switch according to the first embodiment.

The time base in the first row indicates the time during which a process by the OS is executed, wherein the time bases in the second to fourth rows indicate a state in which three tasks (tasks A to C) are processed in sequence. A normal task switching process is performed at regular intervals by the OS using timer interrupts or the like. For example, when tasks are switched from task A to task B, a timer interrupt is first generated during the execution of the process of task A (for example, process A1), at which the OS performs an interrupt process. Thereafter the process of task B (process B1) is started. As previously described, the OS sets a time-out value in the DEC register 101*a* of the CPU 100*a* when executing a task switching process. In general, when the processing time of each task reaches the time-out value, a timer interrupt is generated, and the task switching process is executed. Herein, it is assumed that in process B2 of task B between the processes shown in FIG. 4, a P-instruction becomes the object to be executed when DEC<TH is satisfied. Then, a P-instruction exception is generated through the operation described with reference to FIG. 3, and the interrupt handler in the OS for the P-instruction exception is invoked. That is, process B2 is terminated by the P-instruction exception before the longest processing time of task B is reached and thus task B is terminated by the timer interrupt. After the task switching process of the OS is executed, process C2 of task C is started.

As described above, in the case where the P-instruction becomes the object to be executed at the timing when DEC<TH is satisfied, the longest processing time allocated to the task can be prevented from being reached during execution of the P-instruction by holding the execution of the P-instruction and switching the task. This allows task switch timing to be accurately controlled, thus ensuring the real-time performance of the individual tasks.

There are several methods for introducing the P-instruction. Hereinafter, examples of a method for introduction will be described using an example in which an I/O instruction is set as a P-instruction for a case in which the address space of the CPU is not distinguished between an I/O space and a memory space and a case in which it is not distinguished.

Various embodiments for CPUs exist. In terms of address allocation to an I/O space and a memory space, examples of an address allocation method includes allocating an address without distinguishing them, and separately preparing an address space for I/O devices and an address space for a memory. In the former case, for example, whether the access destination of a load instruction is the memory or the I/O device is distinguished only by an address value and is distinguished by the instruction itself. Then, in order to introduce the P-instruction there may be adding the P-instruction to an instruction set executable by the CPU.

FIG. 5 is a diagram showing an example of an instruction sequence for reading from a memory and reading from I/O devices.

In the example shown in FIG. 5, there are two kinds of read (load) instruction: a normal load instruction (lwz) and a load instruction (lwzd) that is set as a P-instruction separately from the normal instruction. In the instruction sequence, the first and second rows are instructions to set a DDR memory address "0x00000100" in a register r3. Third row is an instruction to read data, that is, the value of the register r3+offset 0, and to set the data in a register r4. The fourth and fifth rows are instructions to set the address "0xF0000400" of an I/O device in the register r3. The sixth row is an instruction to read data, that is, the value of the register r3+offset 0, and to set the data in a register r5.

When focusing attention to the third and sixth instructions, third row is an instruction to read data from the fast DDR memory, and the sixth row is an instruction to read data from an I/O device that may take significantly more time for processing. Therefore, the normal load instruction (lwz) is used in third row, and the load instruction (lwzd), which is a P-instruction, is used in the sixth row. The CPU 100*a* serving as the distinguishing unit 10 determines whether the instruction to be executed is a P-instruction from the kind of the instruction.

While the foregoing is an example in which a P-instruction is set for a load instruction, the P-instruction may be set for various CPU instructions other than the load instruction. In actual programs, to which process the P-instruction is to be used can be determined as appropriate depending on the individual conditions of individual programs. For example, while the normal load instruction (lwz) is employed in third row of FIG. 5 because it is reading from the fast DDR memory, the P-instruction (lwzd) may be used for safety. If it is guaranteed that the process in the sixth row of FIG. 5 is not executed at a timing close to the longest processing time of the task, the normal read instruction (lwz) may be used.

Next, the case where the address space for an I/O device and the address space for a memory separately prepared are described hereinafter.

In this case, for example, for the read (load) instruction, the CPU 100a serving as the distinguishing unit 10 can determine whether the instruction to be executed is an I/O instruction from the instruction itself because the destination address space is different. Accordingly, for example, I/O instructions can be collectively set as P-instructions. The CPU 100a determines whether a CPU instruction to be executed is an I/O instruction using the function of the distinguishing unit 10, wherein if the CPU instruction is an I/O instruction, it can be determined to be a P-instruction, and thus the CPU 100a compares the DEC and TH using the function of the determination unit 20. In this example, since all instructions set as P-instructions, like I/O instructions, are fixedly handled as P-instructions, whether to use a P-instruction cannot be individually determined for each program, as in the case described with reference to FIG. 5.

In the first embodiment, the distinction a P-instruction and determination whether to immediately execute the P-instruction are performed prior to the execution of a CPU instruction (e.g., the execution of the load instruction itself) and do not exert an influence on the execution of the CPU instruction itself. Furthermore, to execute a P-instruction, the P-instruction should be included in an instruction set executable by the CPU 100a, and the CPU 100a should operate as the distinguishing unit 10 and the determination unit 20 when executing the P-instruction. Accordingly, a method for implementing the first embodiment can be determined as appropriate depending on the embodiment of the system. Implementation using an instruction pipeline will be described hereinbelow by way of example.

Figure 6:
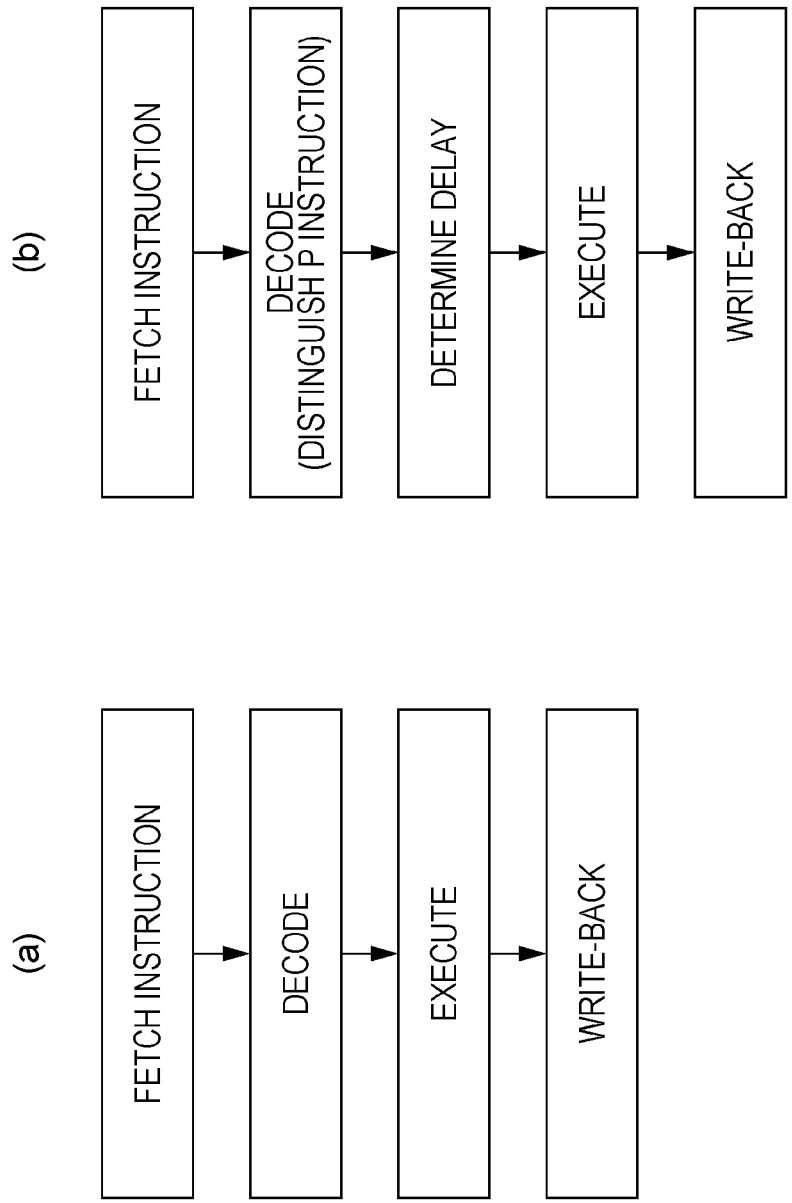
FIG. 6 is a diagram schematically showing the configuration of an instruction pipeline.

FIG. 6 is a diagram schematically showing the configuration of an instruction pipeline, wherein FIG. 6(a) shows a general instruction pipeline and FIG. 6(b) shows an instruction pipeline implementing the first embodiment.

The instruction pipeline shown in FIG. 6(a) includes four process steps: "fetch instruction", "decode", "execute", and "write-back". In contrast, the instruction pipeline implementing the first embodiment, shown in FIG. 6(b), includes five process steps, "fetch instruction", "decode", "determine delay", "execute", and "write-back".

In the example shown in FIG. 6(b), distinction of a P-instruction, which is the function of the distinguishing unit 10, is performed in "decode". Determination whether to immediately execute the P-instruction based on the DEC and TH, which is the function of the determination unit 20, is performed in "determine delay" inserted before "execute". If the DEC is smaller than TH, the execution of the P-instruction is held. Therefore, the CPU discards all the data of the pipeline and sets an instruction pointer to an interrupt pointer to refetch an instruction.

With the implementation using the instruction pipeline as described above, since the operations using the distinguishing unit 10 and the determination unit 20 are executed in the parallel process steps, no significant overhead occurs. The instruction pipelines shown in FIG. 6 schematically show the configurations of basic pipelines. Much more process steps are preferably executed in parallel. Accordingly, the degree of relative overhead due to implementation of the first embodiment further decreases.

A system according to a second embodiment implements the functions of the distinguishing unit 10 and the determination unit 20 and the function task of switching process of the execution unit 30 under the hardware control of a dedicated processor provided separately from the CPU. A method for implementing the distinguishing unit 10 introduces a P-instruction as in the first embodiment.

Figure 7:
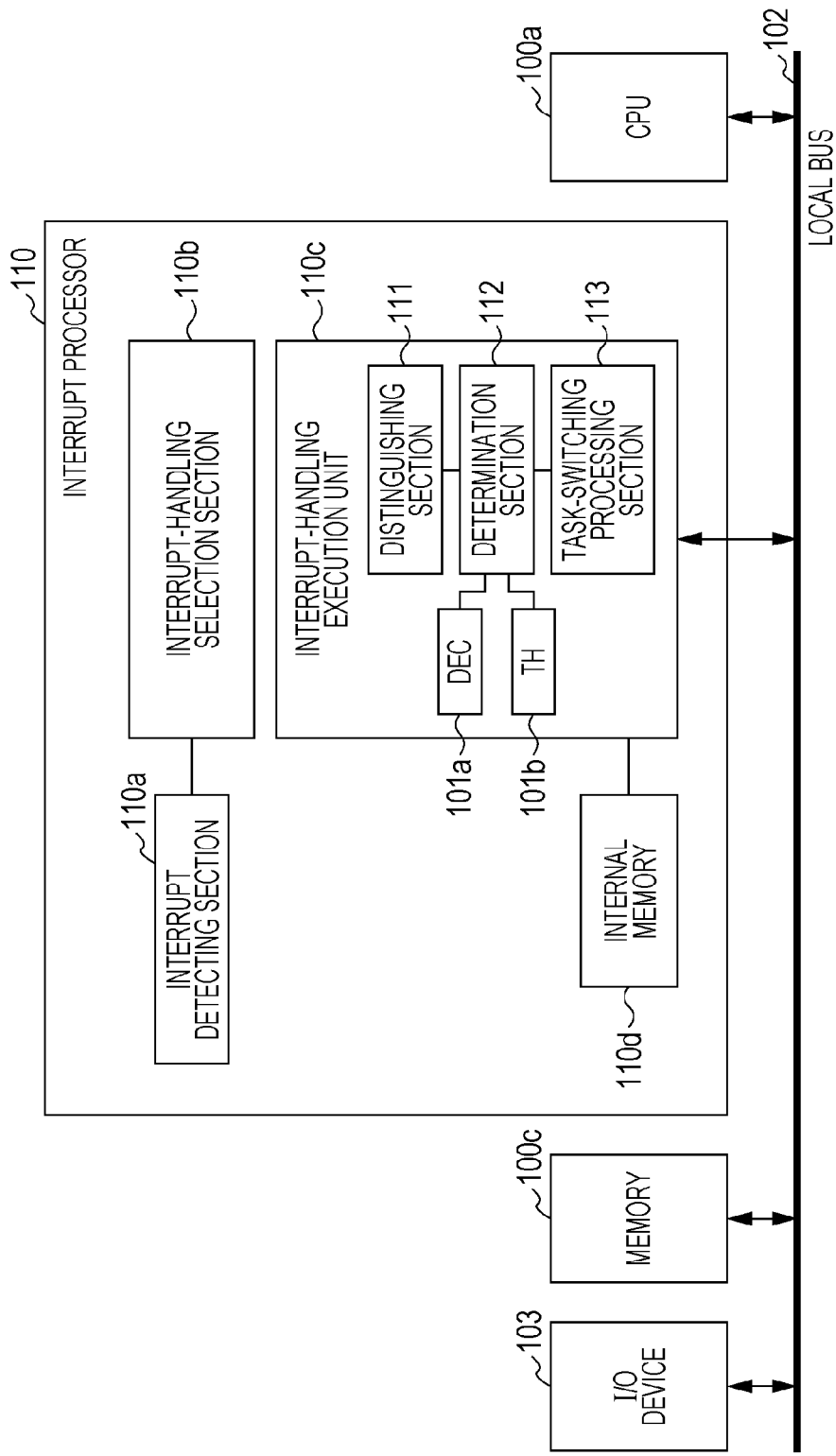
FIG. 7 is a diagram showing an illustrative configuration of a task switch system according to a second embodiment.

FIG. 7 is a diagram showing a configuration example of a task switch system according to a second embodiment.

The system shown in FIG. 7 includes the CPU 100a, which is a general-use CPU, and an interrupt processor 110, which is a dedicated processor for achieving this embodiment. A CPU instruction is read into the CPU 100a or the interrupt processor 110 depending on the kind and is executed. In the case where the CPU instruction read into the interrupt processor 110 is a P-instruction, it is determined whether to immediately execute the instruction. As shown in FIG. 7, the CPU 100a and the interrupt processor 110 are connected to the memory 100c and I/O devices 103 through the local bus 102. This system is implemented, for example, by adding the interrupt processor 110 to the computer 100 shown in FIG. 2.

In the system shown in FIG. 7, the interrupt processor 110 includes an interrupt detecting section 110a, an interrupt-handling selection section 110b, an interrupt-handling execution unit 110c, and an internal memory 110d. The interrupt-handling execution unit 110c includes a distinguishing section 111, a determination section 112, and a task-switch processing section 113. The distinguishing section 111 distinguishes whether an instruction to be executed is a P-instruction. The determination section 112 determines, if the instruction to be executed is a P-instruction, whether to immediately execute the P-instruction or to perform a task switching process without executing the P-instruction. The task-switch processing section 113 executes the task switching process.

In the second embodiment, as shown in FIG. 7, the interrupt-handling execution unit 110c of the interrupt processor 110 includes the DEC register 101a and TH register 101b. Setting the time-out value of the DEC register 101, a task switch is performed by the interrupt-handling execution unit 110c.

Referring back to FIG. 1, section 111 operates as the distinguishing unit 10, and section 112 functions as the determination unit 20. The task-switch processing section 113 executes the task switching process of the execution unit 30. The interrupt processor 110 executes, as the execution unit 30, a CPU instruction (a process that needs a real-time performance etc.) to be executed by the interrupt processor 110. The distinguishing section 111, the determination section 112, and the task-switch processing section 113 are configured as logical circuits. In the system shown in FIG. 7, the CPU 100a executes a CPU instruction (a process that does not need a real-time performance etc.) that is not executed by the interrupt processor 110.

The interrupt detecting section 110a detects interrupt requests from the I/O devices 103. The interrupt detecting section 110a sends interrupt requests not directly to the CPU 100a but to the interrupt-handling selection section 110b. The interrupt-handling selection section 110b selects whether to execute interrupt handling by the CPU 100a or by the interrupt-handling execution unit 110c.

An interrupt handling program is downloaded from the CPU 100a into the internal memory 110d in the interrupt processor 110 through the local bus 102. The interrupt-handling execution unit 110c that has received the interrupt request invokes a corresponding interrupt handling program from the internal memory 110d to execute interrupt handling and notifies completion of the interrupt handling to the CPU 100a.

Figure 8:
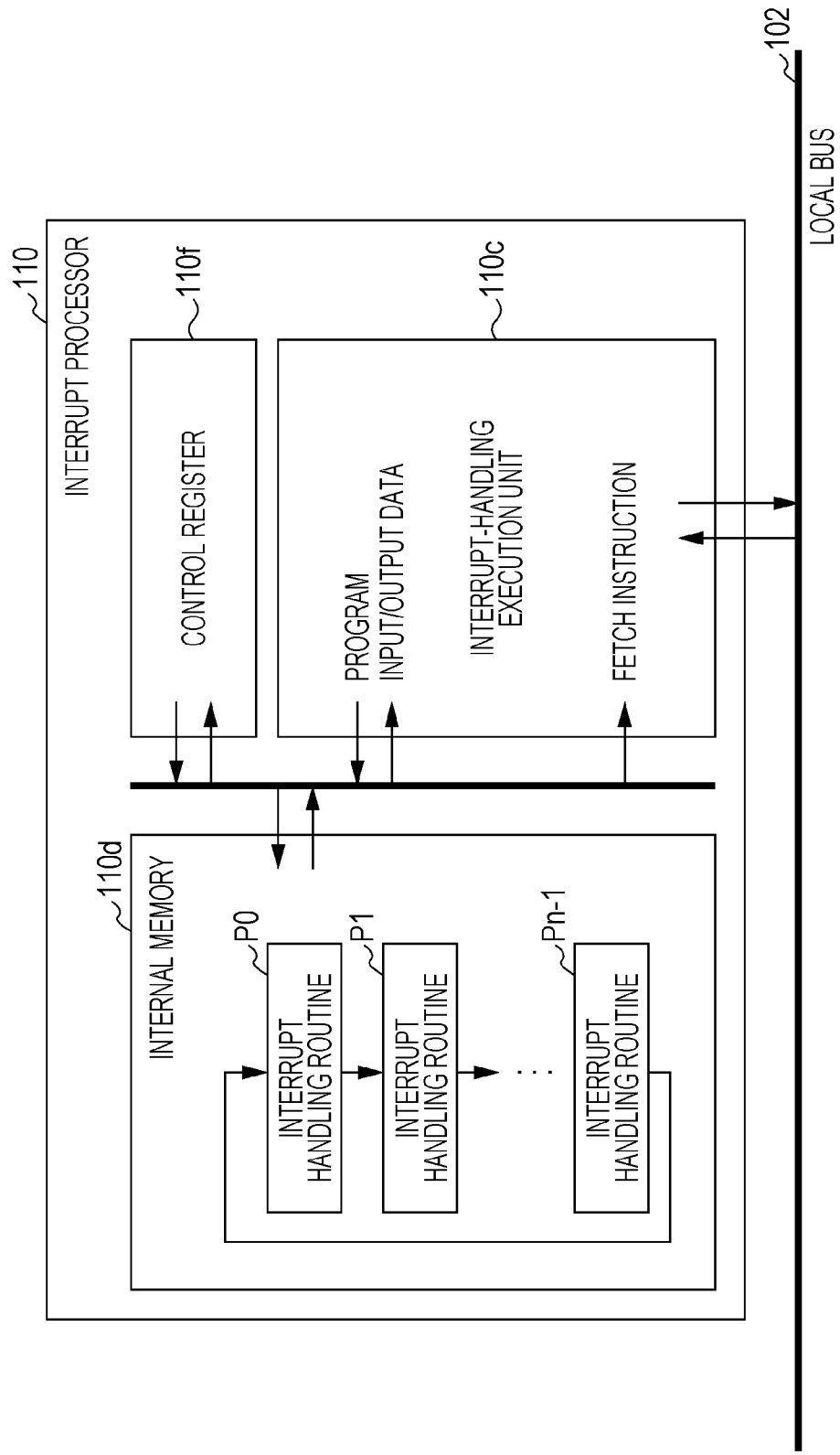
FIG. 8 is a schematic diagram showing the detailed configuration of an interrupt processor according to the second embodiment.

FIG. 8 is a schematic diagram showing the detailed configuration of the interrupt processor 110.

In FIG. 8, between interrupt requests from the individual I/O devices 103, n (n is a natural number) interrupt requests at the maximum are notified to the interrupt-handling execution unit 110c. Herein, n is a fixed value and is determined in terms of hardware when the interrupt-handling execution unit 110c is mounted on a system on chip (SoC). The internal memory 110d stores n interrupt handling routines downloaded in advance from the CPU 100a through the local bus 102. Control register 110f is configured as, e.g., a 32-bit register corresponding to the number of interrupt handling routines Pi.

The interrupt-handling execution unit 110c executes the interrupt handling routines P0, P1, . . . Pn−1 stored in the internal memory 110d while switching them in sequence. The interrupt handling routine Pi (i is an integer from zero to n−1) is executed only when the interrupt handling routine Pi is valid, and when the interrupt request is active. If necessary, the interrupt-handling execution unit 110c finally notifies the interrupt request to the CPU 100a.

In the case where no other process interrupts during execution the interrupt handling although the interrupt handling routine Pi does not end, the interrupt-handling execution unit 110c forcibly passes the control to the next interrupt handling routine Pi+1. Storage of context information when switching interrupt-handling routines is executed in terms of hardware by the interrupt-handling execution unit 110c.

Figure 9:
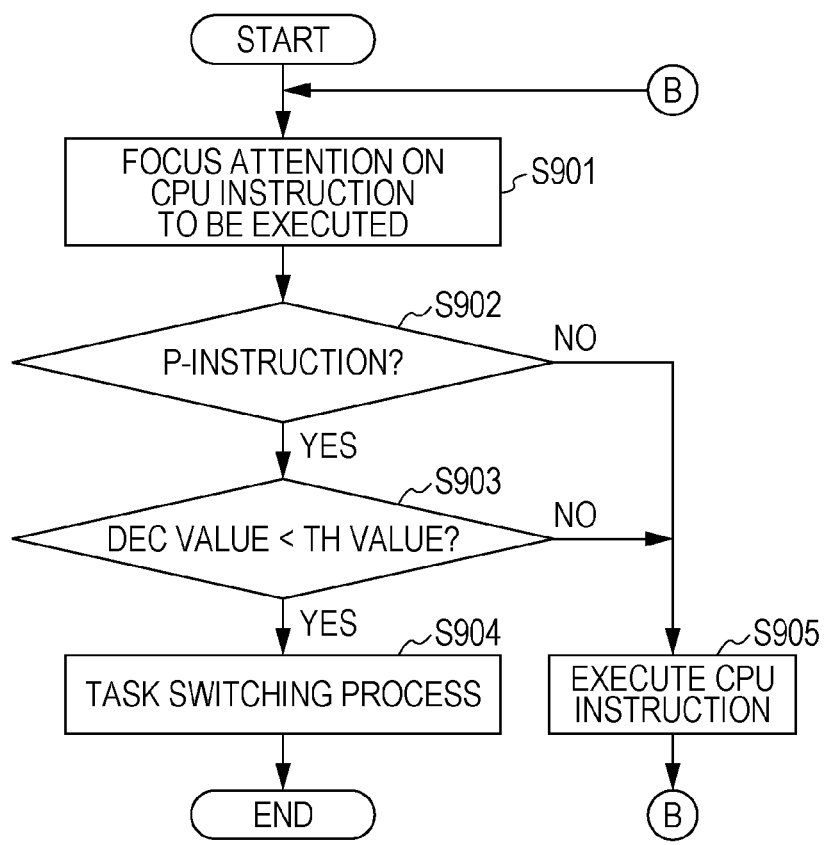
FIG. 9 is a flowchart showing a method for task control according to the second embodiment.

FIG. 9 is a flowchart showing a method for task control according to the second embodiment.

Distinguishing section 111 focuses on a CPU instruction to be executed (step S901) and determines whether the CPU instruction is a P-instruction using the function of the distinguishing unit 10 (step S902). If the CPU instruction is not a P-instruction, the task-switch processing section 113 does not execute the task switching process, and the CPU 100a serving as the execution unit 30 immediately executes the CPU instruction (step S905). The CPU 100a returns to step S901 and focuses on the next CPU instruction to be executed.

If the CPU instruction to be executed is a P-instruction, then the determination section 112 compares the DEC and TH to determine whether to immediately execute the CPU instruction (P-instruction) (step S903). In the example of FIG. 9, if the DEC≥TH, section 112 determines to immediately execute the CPU instruction (P-instruction), and the CPU 100a serving as the unit 30 immediately executes the CPU instruction (step S905). CPU 100a then returns to step S901 and focuses on the next CPU instruction.

If the CPU instruction to be executed is a P-instruction and if the DEC≤TH, the determination section 112 determines to execute a task switching process without immediately executing the CPU instruction (P-instruction). Thus, the task-switch processing section 113 generates an interrupt (P-instruction exception) to execute the task switching process (step S904), and the task to be executed by the CPU 100a is switched.

In the multitask environment, the task switching process is executed using timer interrupts irrespective of whether a CPU instruction to be executed is a P-instruction and irrespective of the DEC. In the second embodiment, as described with reference to FIGS. 7 and 8, the normal task switching process using the timer interrupts is executed by the task-switch processing section 113.

Figure 10:
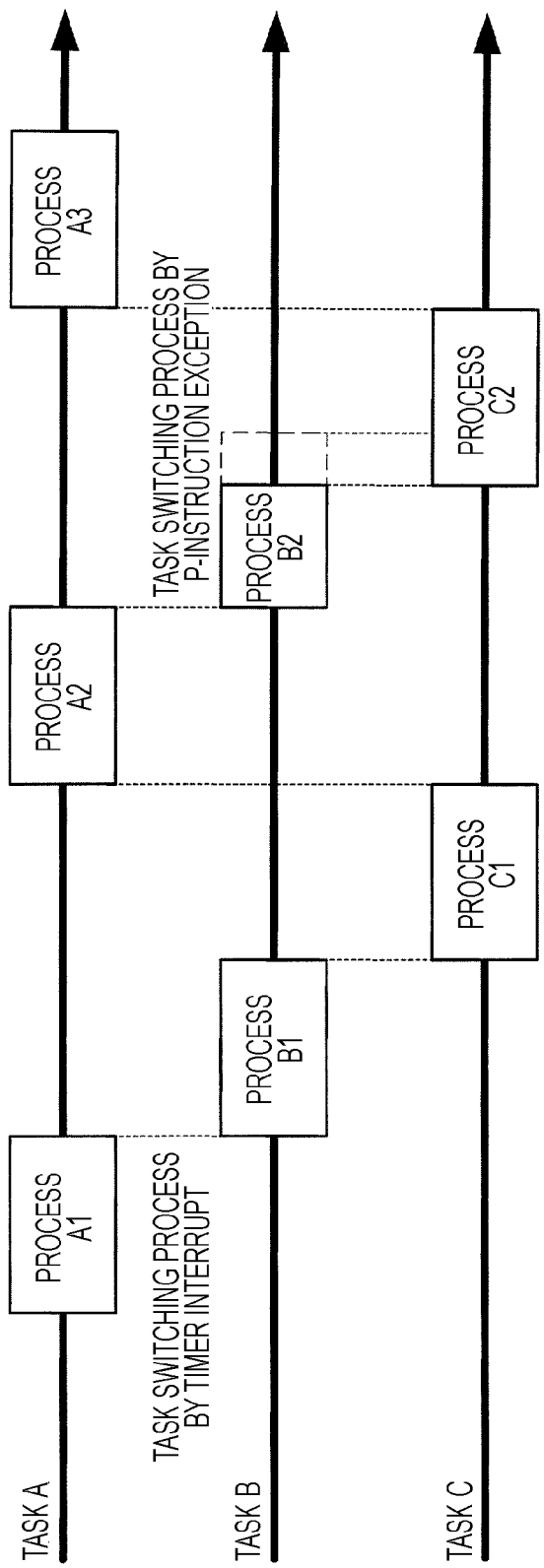
FIG. 10 is a time chart illustrating the state of task switch according to the second embodiment.

FIG. 10 is a time chart illustrating the state of task switch according to the second embodiment.

In the second embodiment, the task-switch processing section 113 of the interrupt processor 110 forcibly executes the task switching process, as described above. Accordingly, FIG. 10 does not show a time base indicating the time during which a process by the OS is executed. The time bases from the first to third rows indicate a state in which three tasks (tasks A to C) are processed in sequence.

The normal task switching process is performed at regular intervals using timer interrupts. For example, when tasks are switched from task A to task B, a timer interrupt is first generated during the execution of the process of task A (for example, process A1) to forcibly switch the process to the process of task B (process B1). When the task switching process is executed, a time-out value is set in the DEC register 101a, as described above. In general, when the processing time of each task reaches the time-out value, the task switching process is executed.

Herein, it is assumed that in the process B2 of the task B between the processes shown in FIG. 10, a P-instruction becomes the object to be executed when DEC<TH is satisfied. Then, the task switching process is executed through the operation described with reference to FIG. 9. That is, process B2 is forcibly terminated before the longest processing time of task B is reached and thus task B is terminated by the timer interrupt, and the process C2 of task C is started.

As described above, in the case where the P-instruction becomes the object to be executed at the timing when DEC<TH is satisfied, the longest processing time allocated to the task can be prevented from being reached during execution of the P-instruction by holding the execution of the P-instruction and switching the task. This allows task switch timing to be accurately controlled, thus ensuring the real-time performance of the individual tasks.

The interrupt processor 110 of the second embodiment enhances the real-time performance of the process and is provided assuming task switch in far shorter time than that of a general CPU (e.g., CPU 100a). For such a system, the task control of this embodiment is particularly effective.

Moreover, the presence or absence of TH register 101b and the setting of TH are the same as in the first embodiment. The method for introducing the P-instruction is also the same as that described in the first embodiment. Implementation of the second embodiment is also the same as that of the first embodiment, including the implementation using the instruction pipeline.

A system according to a third embodiment implements the functions of the distinguishing unit 10 and the determination unit 20 under the hardware control of a dedicated processor provided separately from the CPU. Unlike the first and second embodiments, the distinguishing unit 10 is implemented by not introducing a P-instruction different from a general CPU instruction by analyzing a CPU instruction that the CPU reads from a memory using a dedicated processor.

Figure 11:
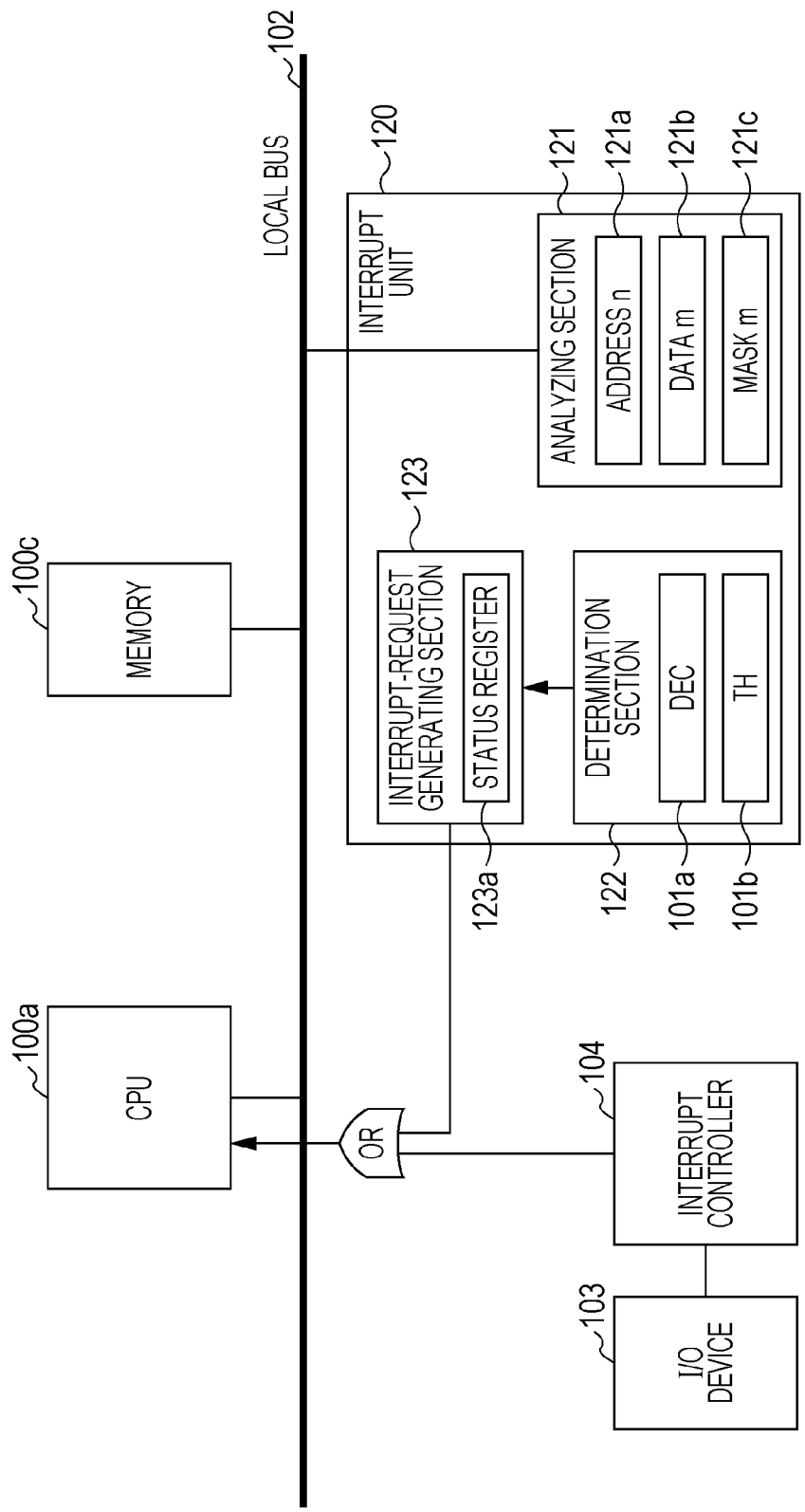
FIG. 11 is a diagram showing a configuration example of a task switch system according to a third embodiment.

FIG. 11 is a diagram showing a configuration example of a task switch system according to a third embodiment.

The system shown in FIG. 11 includes CPU 100a and interrupt unit 120 for executing interrupts for task control according to this embodiment. As shown in FIG. 11, CPU 100a and interrupt unit 120 are connected to memory 100c through local bus 102. Interrupt unit 120 is preferably connected to the CPU 100a together with interrupt controller 104 that controls interrupt requests from the I/O devices 103 via an OR circuit. This system can be implemented, for example, by adding the interrupt unit 120 to the computer 100 shown in FIG. 2.

In the system shown in FIG. 11, the interrupt unit 120 preferably includes an analyzing section 121, a determination section 122, and an interrupt-request generating section 123. The analyzing section 121 monitors an instruction fetch of the CPU 100a and analyzes the fetched CPU instruction. Section 122 determines if the instruction to be executed is a P-instruction, whether to immediately execute the P-instruction or to perform a task switching process without executing the P-instruction. The interrupt-request generating section 123 generates an interrupt request to CPU 100a. Determination section 122 of the interrupt unit 120 includes the DEC register 101a and TH register 101b. Setting of the time-out value of the DEC register 101a for task switch is performed by the determination section 122.

Herein, analyzing section 121 operates as distinguishing unit 10 shown in FIG. 1 and section 122 functions as determination unit 20. The analyzing section 121, the determination section 122, and the interrupt-request generating section 123 are configured as logical circuits. In the system shown in FIG. 11, CPU 100a functions as the executing unit 30 shown in FIG. 1.

The analyzing section 121 includes a bus monitoring circuit and an address and data comparing circuit. The analyzing section 121 monitors the address and data lines of the local bus 102 using the function of the bus monitoring circuit to obtain a CPU instruction that the CPU 100a has read from the memory 100c. The analyzing section 121 determines, with the function of the address and data comparing circuit, whether the obtained CPU instruction corresponds to a CPU instruction to be determined by the determination section 122 (corresponding to the P-instruction in the first and second embodiments). In the third embodiment, it is preferable that at least a CPU instruction to be determined by the determination section 122 be stored in a no-cache memory area of the memory 100c. This is because since the CPU instruction is obtained by the bus monitoring circuit when the CPU 100a reads the CPU instruction from the memory 100c, the analyzing section 121 cannot obtain the instruction read from a cache if the CPU 100a caches the CPU instruction.

Analyzing section 121 preferably includes an address register 121a, a data register 121b, and a mask register 121c. They are provided in accordance with the number of CPU instructions to be determined by the determination section 122. In the example shown in FIG. 11, n address registers 121a are provided. The data registers 121b and the mask registers 121c are provided m each in one-to-one correspondence. Analyzing section 121 extracts an address that the CPU 100a has accessed from the obtained CPU instruction and checks what value in the address register 121a the obtained value matches. If the value matches any register value, the analyzing section 121 determines that the CPU instruction is a CPU instruction to be determined by the determination section 122.

Moreover, analyzing section 121 checks whether the data of the obtained CPU instruction (that is, the CPU instruction itself) matches any value in the data register 121b. In this matching, the analyzing section 121 compares, between the data of the CPU instruction, only a bit designated by the mask register 121c corresponding to the data register 121b. If the data matches any register value, the analyzing section 121 determines that the CPU instruction is a CPU instruction to be determined by the determination section 122. The CPU instruction, only the bit designated by the mask register 121c is compared with the value of the data register 121b is to compare only the OP code of the CPU instruction. A CPU instruction described in a machine language is constituted of an OP code described in a high-order digit and a register value described in a low-order digit. Thus, the portion of the register value of the CPU instruction is masked using the value of the mask register 121c.

Although it is determined whether the obtained CPU instruction is an instruction to be determined by the determination section 122 based on the memory address of the CPU instruction or the CPU instruction itself, it may be determined based on the combined conditions thereof. For example, only a predetermined instruction read from a predetermined address may be determined to be a CPU instruction to be determined by the determination section 122. Alternatively, only one of the memory addresses of the CPU instruction and the CPU instruction itself may be used as a determination condition. For instance, a predetermination may be employed in which it is determined for all CPU instructions are only based on the kinds whether they are CPU instructions to be determined by the determination section. In this case, the address register 121a is not an absolutely necessary component of the analyzing section 121 and may be omitted.

While the acquisition of CPU instructions by the analyzing section 121 is generally performed in units of several words, in what unit the comparison with the register is made is not particularly limited. For example, with a 32-bit RISC processor in which code is fetched in units of 32 bytes, the bit width of the data (mask) register may be set at 32 bits (corresponding to one instruction), and 32-byte data may be separated into eight portions and may be compared at the same time.

If the analyzing section 121 determines that an obtained CPU instruction is a CPU instruction to be determined by the determination section 122, the determination section 122 determines whether to immediately execute the CPU instruction. A concrete determination method is the same as that of the first and second embodiments. That is, the determination section 122 compares the DEC (the remaining time of the task) and TH (the threshold value), wherein if the DEC<TH is satisfied, the determination section 122 determines not to immediately execute the CPU instruction and to execute the task switching process.

If the section 122 determines to perform the task switching process, the interrupt-request generating section 123 generates an interrupt request and sends the interrupt request to the CPU 100a. The interrupt-request generating section 123 includes a status register 123a.

In response to the interrupt request, the CPU 100a executes an interrupt handler that the OS provides. At that time, by reading the status register 123a of the interrupt-request generating section 123, the CPU 100a determines that the interrupt is not an interrupt by the interrupt controller 104 but an interrupt by the interrupt unit 120.

According to third embodiment, since the interrupt unit 120 analyzes a CPU instruction and generates an interrupt to execute a task switching process, there is no need to expand an instruction set that the CPU 100a executes, as in the first and second embodiments. The presence or absence of TH register 101b and the setting of TH are the same as in the first embodiment.

Hereinafter, an application to a critical section this embodiment will be described.

When the CPU executes a critical section a program, it is necessary to ensure the inseparability of the section by exclusive control or the like. Therefore, in a multitask control, an interrupt cannot be generated during execution of the critical section a task, so that a task switching process cannot be performed. Accordingly, with multitask control that requires real-time processing, there is a possibility that the real-time performance is impaired due to the presence of the critical section.

In contrast, applying this embodiment ensures that the real-time performance can be provided even if the critical section is present. A P-instruction is generally described immediately before the critical section, allowing the P-instruction to be executed before the CPU executes the critical section. Therefore, if the remaining time of the task has become shorter than the threshold value when the P-instruction immediately before executing the critical section, the P-instruction is not executed, and the task is switched without entering the critical section. This can prevent the CPU from impairing the real-time performance because the task cannot switch even if the longest processing time is reached since the process has entered the critical section.

Figure 12:
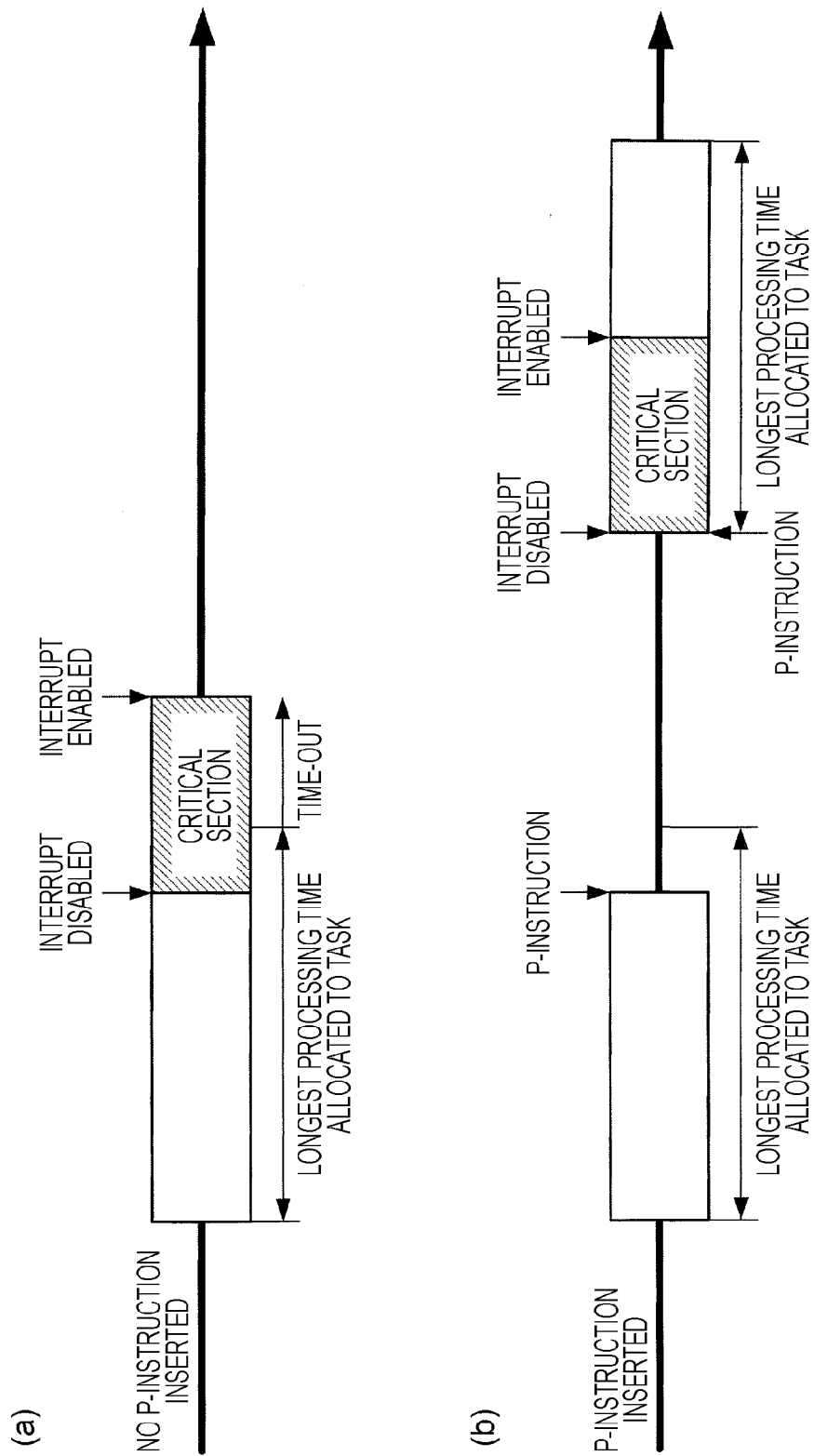
FIG. 12 is a time chart showing the state of task processing including a critical section this embodiment.

FIG. 12 is a time chart showing the state of task processing including the critical section. FIG. 12(a) shows an operation in the case where a P-instruction is not inserted immediately before the critical section, and FIG. 12(b) shows an operation in the case where a P-instruction is inserted immediately before the critical section.

Referring to the time base in FIG. 12(a), the longest processing time allocated to the task has been reached during execution of the critical section. However, even if the longest processing time has been reached, the task cannot be switched because an interrupt is disabled by exclusive control when entering the critical section, and no interrupt is enabled until the critical section ends.

In contrast, referring to the time base in FIG. 12(b), a P-instruction is read immediately before the critical section, and a task switching process is performed without executing a process including the critical section following the P-instruction because the remaining time of the task is short. Then, the process is restarted from the P-instruction when the same task is executed next, and the critical section is executed.

In the case where this embodiment is applied to the critical section as described above, it is necessary to set threshold value (the value of TH register) in accordance with the time required to execute the critical section. Although an example in which the P-instruction used in the first and second embodiments is described immediately before the critical section has been described in the above, third embodiment can also be applied to the critical section.

In the case where the embodiment is applied to the critical section, the P-instruction that is described immediately before the critical section determines whether to enter the critical section, and the details of the instruction itself are not particularly limited. For example, a NOP-instruction or the like for which no substantial process is executed may be set as a P-instruction and may be described before the critical section.

Although embodiments have been described, the technical scope of the present invention is not limited to the scope described in the embodiments. For example, in the first and second embodiments, P-instructions are set individually for CPU instructions that need to be determined whether to be immediately executed (CPU instructions that take an uncertain processing time, probably long, such as a load/store instruction and a sync instruction for synchronizing a series of instructions that are processed in parallel). In contrast, the embodiments can be achieved not by setting P-instructions for the CPU instructions themselves but by describing NOP-instructions or the like set as P-instructions immediately before the CPU instructions. It is obvious from the scope of the Claims that various changes or modifications of the above embodiments are also included in the technical scope of the present invention.

What is claimed is:

1. A system provided with a processor that executes processes while switching between a plurality of tasks, the system comprising:
   a distinguishing unit for identifying a running postponable instruction based on a description of the running postponable instruction;
   a determination unit for comparing a remaining processing time allocated by an operating system for the running postponable instruction to a preset threshold value, the preset threshold value is set in advance based on a processing time required to execute the running postponable instruction, wherein different threshold values to be set depending on the kinds of postponable instruction; and
   an executing unit for executing a task switch terminating the running postponable instruction if the remaining processing time allocated by the operating system for the running postponable instruction is less than the preset threshold value,
   wherein the running postponable instruction is described immediately before a critical section, and is executed before the execution of the critical section, and
   wherein if the remaining processing time allocated by the operating system for the running postponable instruction has become shorter than the threshold value, the running postponable instruction is not executed, and the running postponable instruction is switched without entering the critical section.

2. The system according to claim 1, wherein the processor executes the running postponable instruction and implements functions of the distinguishing unit, the determination unit, and the executing unit.

3. The system according to claim 1, further comprising:
   another processor dedicated for executing the running postponable instruction and implementing functions of the distinguishing unit, the determination unit, and the executing unit, the second processor not being a central processing unit.

4. The system according to claim 1, wherein:
   the executing unit comprises an interrupt handler, and the determination unit generates an interrupt and invokes the interrupt handler.

5. The system according to claim 1, wherein functions of the distinguishing unit and the determination unit are performed by an instruction pipeline.

6. The system according to claim 1, wherein the distinguishing unit comprises a bus monitoring circuit that identifies the running postponable instruction based on a description of the instruction, a memory address, or both.

7. The system according to claim 1, further comprising:
   a decrementer register for storing a time-out value set by the operating system, the decrementer register being decremented by one unit every processor clock cycle, and the remaining processing time allocated by the operating system for the running postponable instruction is identified by the time-out value stored in the decrementer register; and
   a threshold register for storing the preset threshold value.

8. A method for executing processes while switching between a plurality of tasks, the method comprising:
   identifying a running postponable instruction based on a description of the running postponable instruction;

comparing a remaining processing time allocated by an operating system for the running postponable instruction to a preset threshold value, the preset threshold value is set in advance based on a processing time required to execute the running postponable instruction, wherein different threshold values to be set depending on the kinds of postponable instruction; and executing a task switch terminating the running postponable instruction if the remaining processing time allocated by the operating system for the running postponable instruction is less than the preset threshold value, wherein the running postponable instruction is described immediately before a critical section, and is executed before the execution of the critical section, and wherein if the remaining processing time allocated by the operating system for the running postponable instruction has become shorter than the threshold value, the running postponable instruction is not executed, and the running postponable instruction is switched without entering the critical section, wherein any of the above steps are carried out using a computer.

* * * * *